US010302358B2

(12) United States Patent
Fujimori et al.

(10) Patent No.: US 10,302,358 B2
(45) Date of Patent: May 28, 2019

(54) FOOD HEATING DEVICE

(71) Applicant: NICHIREI FOODS INC., Tokyo (JP)

(72) Inventors: Yoshito Fujimori, Chiba (JP); Hiroaki Murata, Chiba (JP); Kengo Uno, Chiba (JP); Jiro Kitamura, Chiba (JP); Kimihiro Mori, Chiba (JP); Yu Nakanishi, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 246 days.

(21) Appl. No.: 15/324,300

(22) PCT Filed: Jul. 8, 2015

(86) PCT No.: PCT/JP2015/069608
§ 371 (c)(1),
(2) Date: Jan. 6, 2017

(87) PCT Pub. No.: WO2016/006625
PCT Pub. Date: Jan. 14, 2016

(65) Prior Publication Data
US 2017/0176101 A1   Jun. 22, 2017

(30) Foreign Application Priority Data
Jul. 11, 2014   (JP) .................................. 2014-143082

(51) Int. Cl.
F26B 17/04   (2006.01)
A47J 27/14   (2006.01)
A47J 27/16   (2006.01)

(52) U.S. Cl.
CPC .............. *F26B 17/04* (2013.01); *A47J 27/14* (2013.01); *A47J 27/16* (2013.01)

(58) Field of Classification Search
CPC ............. F26B 17/04; A47J 27/14; A47J 27/16
(Continued)

(56) References Cited

U.S. PATENT DOCUMENTS 1,603,568 A * 10/1926 Wilson .................... F26B 17/04
                                                              34/167
3,250,315 A *  5/1966 Osborne ................... F26B 3/20
                                                              165/120

(Continued)

FOREIGN PATENT DOCUMENTS

CN            1909792 A      2/2007
JP         S60-139214 A      7/1985
(Continued)

OTHER PUBLICATIONS

Feb. 7, 2018 Search Report issued in European Patent Application No. 15818731.
(Continued)

*Primary Examiner* — Stephen M Gravini
(74) *Attorney, Agent, or Firm* — Oliff PLC

(57) ABSTRACT

A food heating device includes a conveying unit, a heating unit, and a suction unit. The conveying unit has an endless belt member which allows hot air to pass therethrough. The belt member has an outgoing side on which the food is placed, and a return side, wherein the outgoing side passes through a space between the heating unit and the suction unit, and the return side is disposed to face the outgoing side and avoid the space between the heating unit and the suction unit.

20 Claims, 7 Drawing Sheets

(58) Field of Classification Search
USPC ........................................................... 34/546
See application file for complete search history.

(56) References Cited

U.S. PATENT DOCUMENTS

| | | | | |
|---|---|---|---|---|
| 4,746,968 | A * | 5/1988 | Wear | A23L 3/54 |
| | | | | 219/685 |
| 5,570,626 | A * | 11/1996 | Vos | A47J 27/14 |
| | | | | 99/404 |
| 5,609,095 | A * | 3/1997 | Lemke | A47J 27/16 |
| | | | | 99/468 |
| 6,151,798 | A * | 11/2000 | Petersen | B01D 1/18 |
| | | | | 34/218 |
| 6,931,758 | B2 * | 8/2005 | Sakamoto | A24B 3/04 |
| | | | | 34/137 |
| 7,059,317 | B2 * | 6/2006 | Kobayashi | A21B 1/245 |
| | | | | 126/21 A |
| 7,343,912 | B2 | 3/2008 | Jones et al. | |
| 8,196,312 | B2 * | 6/2012 | Taguchi | B41C 1/1083 |
| | | | | 118/65 |
| 8,984,763 | B2 * | 3/2015 | Savarese | F26B 3/28 |
| | | | | 34/266 |
| 9,234,701 | B2 * | 1/2016 | Wada | B02C 13/282 |
| 9,456,623 | B2 * | 10/2016 | Silbermann | A23B 9/08 |
| 2005/0139203 | A1 | 6/2005 | Jones et al. | |
| 2015/0313273 | A1 * | 11/2015 | Stromotich | A23L 3/54 |
| | | | | 34/259 |
| 2017/0176101 | A1 * | 6/2017 | Fujimori | A47J 27/14 |
| 2018/0105309 | A1 * | 4/2018 | Cornish | B65B 11/08 |
| 2018/0249719 | A1 * | 9/2018 | Van Loon | A21B 3/07 |

FOREIGN PATENT DOCUMENTS

| | | | |
|---|---|---|---|
| JP | H05-64617 U | 8/1993 | |
| JP | H09-108105 A | 4/1997 | |
| JP | 2005-049060 A | 2/2005 | |
| JP | 4060765 B2 | 3/2008 | |
| JP | 3167774 A4 * | 3/2018 | ............ A47J 27/14 |
| WO | WO 2016006625 A1 * | 1/2016 | ............ A47J 27/14 |

OTHER PUBLICATIONS

Mar. 2, 2018 Office Action issued in Chinese Patent Application No. 201580034776.8.

Aug. 18, 2015 Search Report issued in International Patent Application No. PCT/JP2015/069608.

* cited by examiner

FOOD HEATING DEVICE

TECHNICAL FIELD

The present invention relates to a food heating device adapted to heat a food by blowing hot air to the food.

BACKGROUND ART

Conventionally, there is a known food heating device in which a food is heated while the food is being conveyed by an endless belt member. Examples of such conventional device include a device described in PTL 1. In the device described in PTL 1, the hot air is generated by a hot air generating device, and the generated hot air is sent to a single-graining device through a hot air duct. A hot air flow is generated by an exhaust fan so that the hot air uniformly flows through the mesh of a net conveyor from an upper side toward a lower side. The hot air is blown to the food moving on the net conveyor, so that the food is dried.

CITATION LIST

Patent Literature

PTL 1: Japanese Unexamined Patent Application Publication No. 2005-49060

SUMMARY OF INVENTION

Technical Problem

However, in the art described in PTL 1, the exhaust fan and the entire net conveyor which conveys the food are surrounded by a cabinet; therefore, not only the net conveyor is excessively heated, but also the food stuck to the net conveyor is exposed to a high-temperature environment for long time, so that there is a possibility that the food might be burned. As a result, in the art described in PTL 1, there is not only a possibility that the burned food might be mixed into the finished product as a foreign matter, but also a possibility that the net conveyor that conveys the food might be damaged due to being excessively heated.

In view of the aforesaid problems of the conventional art, an object of the present invention is to provide a food heating device in which a belt member that conveys the food can be inhibited from being excessively heated, and in which the food stuck to the belt member can be inhibited from being burned.

Solution to Problem

To solve the above problems and achieve the object of the present invention, a food heating device according to an aspect of the present invention includes: a conveying unit, a heating unit and a suction unit. The conveying unit conveys a food. The heating unit blows hot air to the food conveyed by the conveying unit. The suction unit is disposed to face the heating unit and can suck hot air passing through the conveying unit and the food. Further, the conveying unit includes an endless belt member enabling the hot air to pass therethrough, and a rotating body capable of movably supporting the belt member. The belt member has an outgoing side on which the food is placed, and a return side which is continuous with the outgoing side, wherein the outgoing side passes through a space between the heating unit and the suction unit, and the return side is disposed to face the outgoing side and avoid the space between the heating unit and the suction unit

Advantageous Effects of Invention

With the food heating device having the aforesaid configuration, the belt member that conveys the food can be inhibited from being excessively heated, and the food stuck to the belt member can be inhibited from being burned.

BRIEF DESCRIPTION OF DRAWINGS

FIG. 5A and FIG. 5B are views showing a positional relationship of a suction box and a suction guide member of the food heating device according to the embodiment of the present invention with respect to a food; wherein
FIG. 5A is viewed from a lateral side of the suction box,
and FIG. 5B is viewed from the top of the suction box.

DESCRIPTION OF EMBODIMENTS

Figure 1:
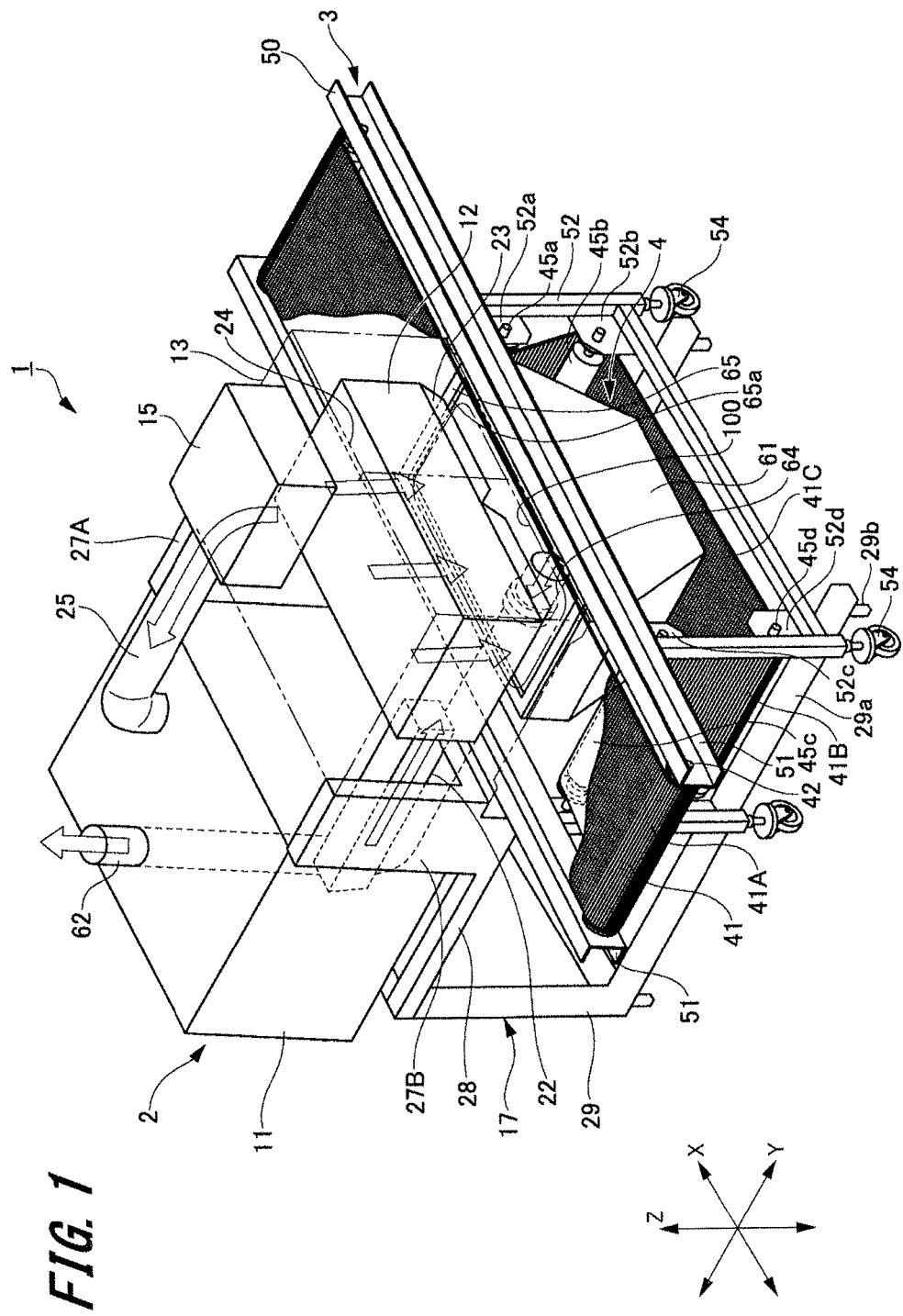
FIG. 1 is a perspective view showing a schematic configuration of a food heating device according to an embodiment of the present invention.

The food heating device according to an embodiment of the present invention will be described below with reference to FIG. 1 to FIG. 8. Note that the same components in the drawings are denoted by the same reference numerals.

1. Configuration Examples of Food Heating Device

First, a configuration example of the food heating device (referred to as "present example" hereinafter) will be described below with reference to FIG. 1 to FIG. 6.

Figure 2:
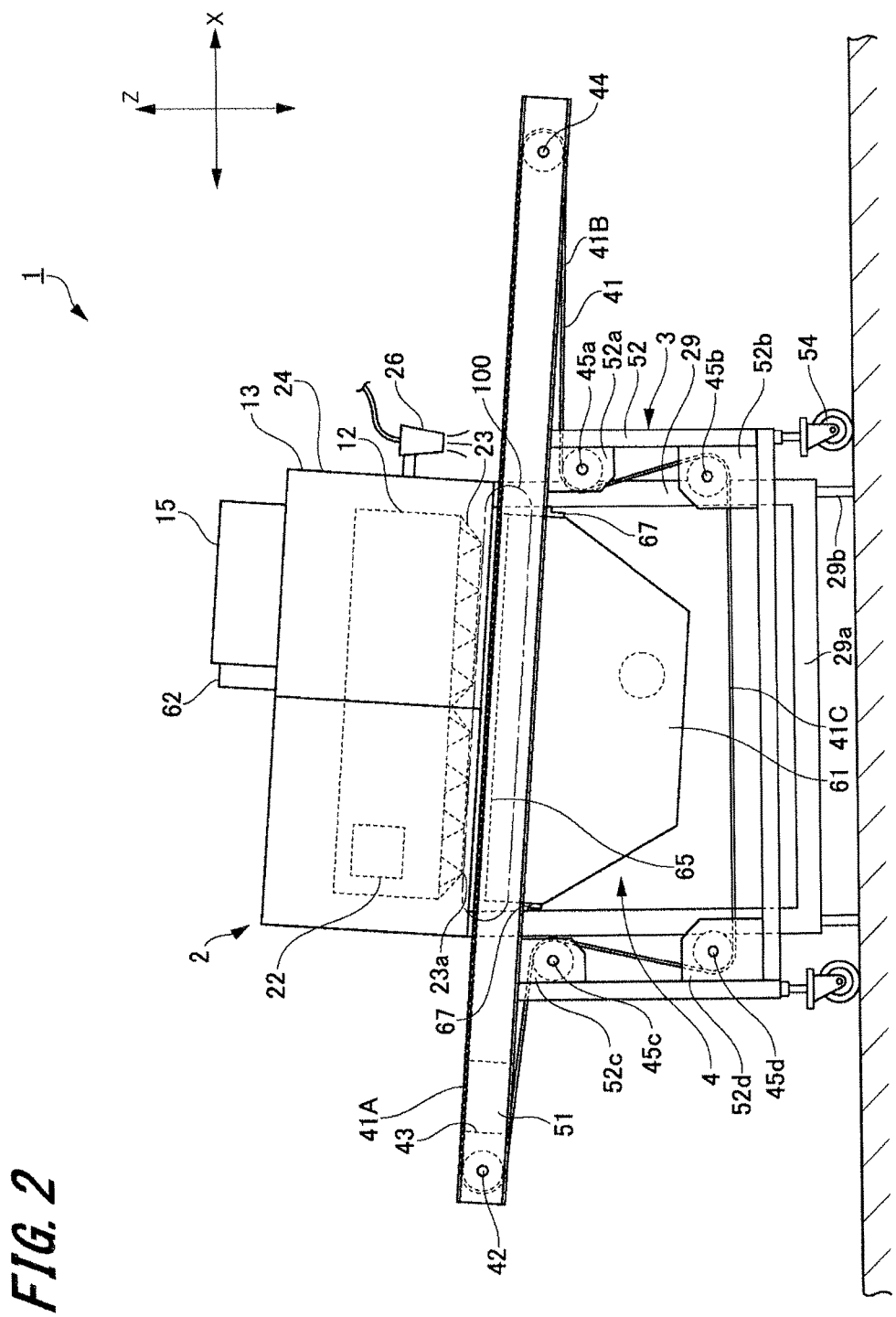
FIG. 2 is a side view of the food heating device according to the embodiment of the present invention.
Figure 3:
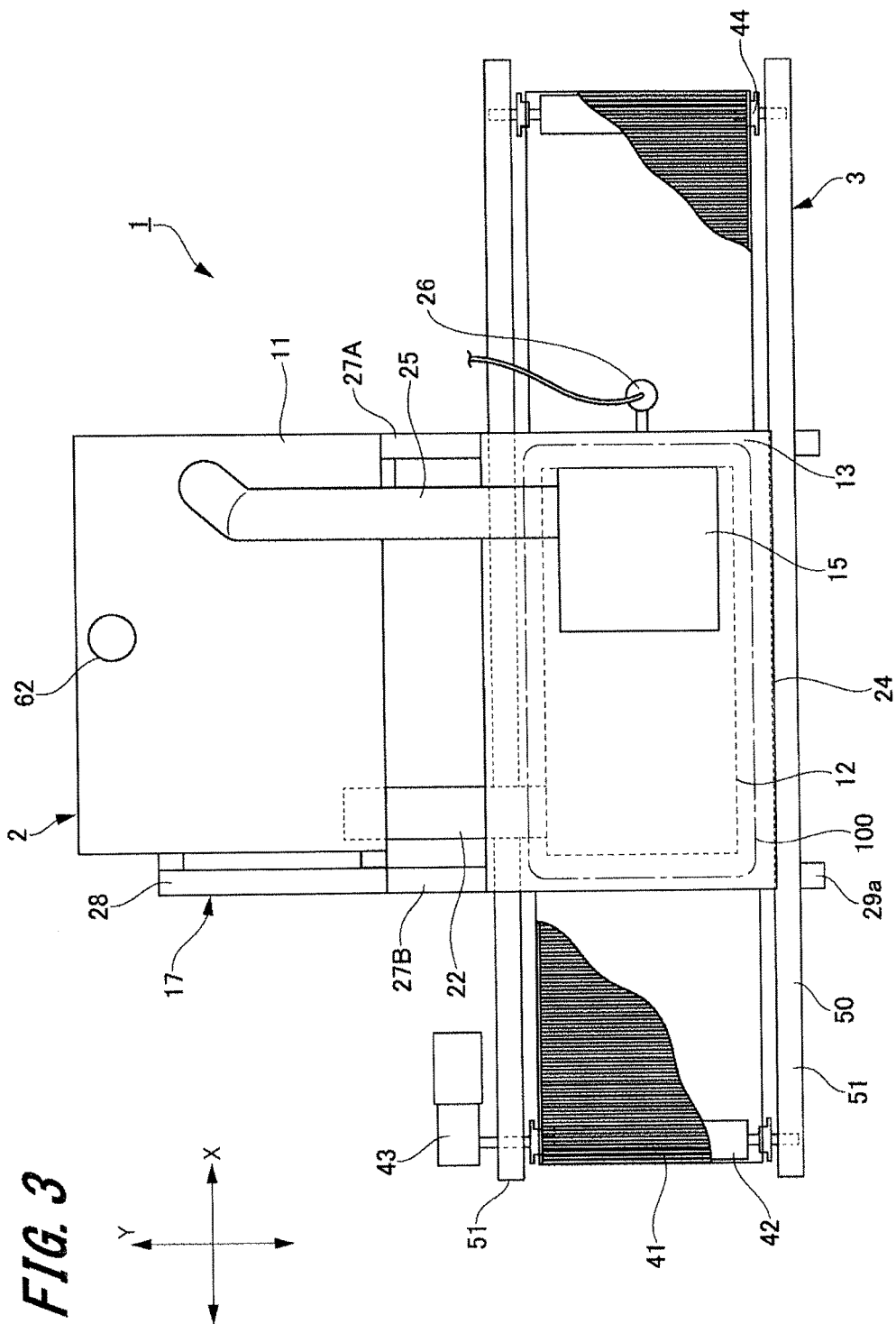
FIG. 3 is a top view of the food heating device according to the embodiment of the present invention.
Figure 4:
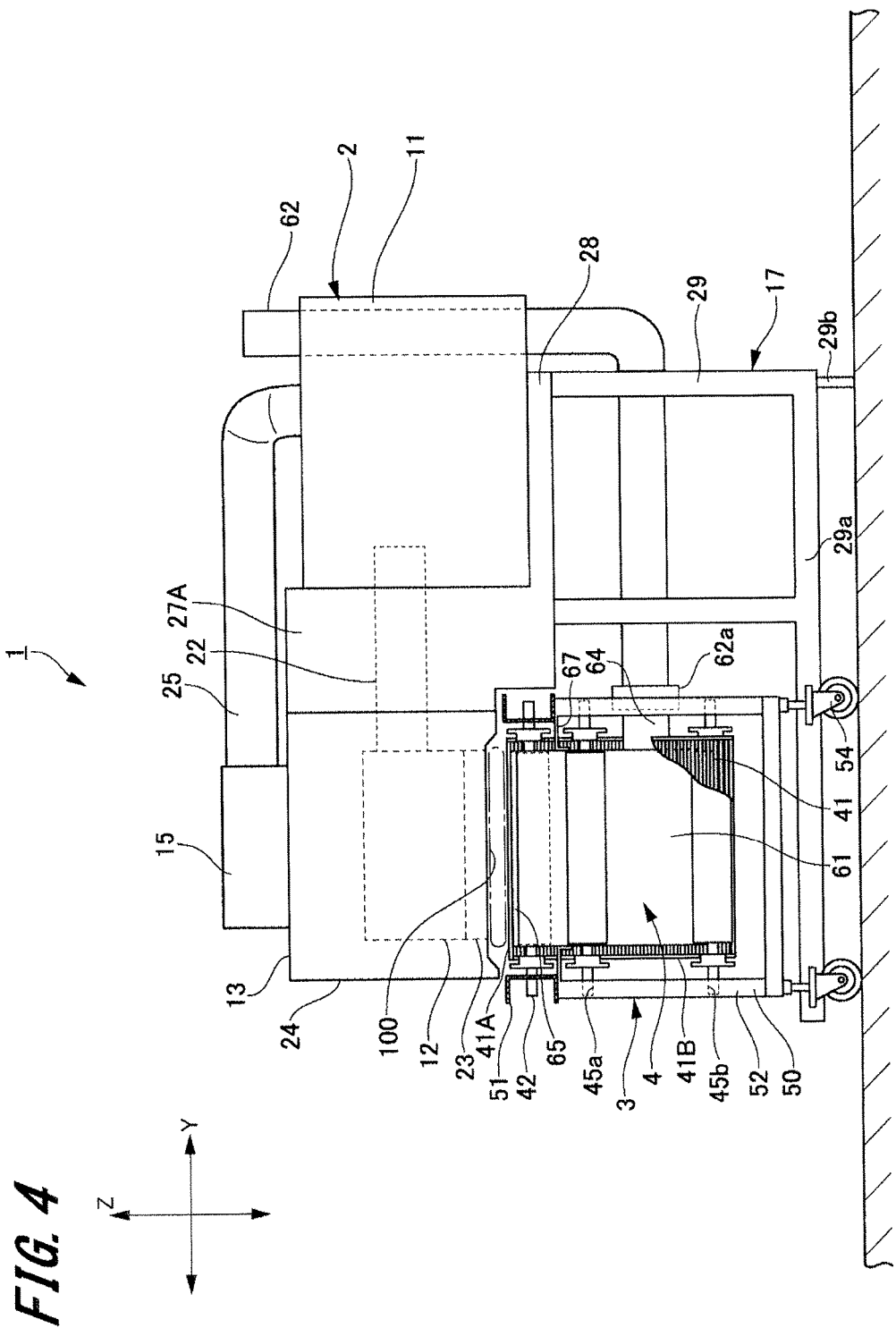
FIG. 4 is a front view of the food heating device according to the embodiment of the present invention.

FIG. 1 is a perspective view showing a schematic configuration of the food heating device, FIG. 2 is a top view of the food heating device, FIG. 3 is a side view of the food heating device, and FIG. 4 is a front view of the food heating device. Incidentally, in FIG. 4, a part of a belt member of the food heating device is shown in section.

A food heating device 1 shown in FIG. 1 is adapted to blow hot air to a food so as to heat the food. As shown in FIG. 1, the food heating device 1 includes a heating unit 2, a conveying unit 3 and a suction unit 4, wherein the heating unit 2 blows the hot air to the food, the conveying unit 3 conveys the food, and the suction unit 4 sucks the hot air passing through the food and the conveying unit. Here, the direction in which the conveying unit 3 conveys the food is defined as a first direction X, and the direction parallel to the horizontal direction and perpendicular to the first direction X is defined as a second direction Y. Further, the vertical direction of the food heating device 1 perpendicular to the second direction Y is defined as a third direction Z.

[Heating Unit]

The heating unit 2 includes a combustion furnace 11, a blowing box 12, a cover member 13, and a circulator 15. Further, the heating unit 2 includes a supporting stand for heating 17 adapted to support the combustion furnace 11 and the cover member 13. The combustion furnace 11 (which is an example of a heating portion) is arranged on one side in the second direction Y, and the blowing box 12 and the cover member 13 are arranged on the other side in the second direction Y.

The combustion furnace 11 is provided with an inlet (not shown) for taking in air from the outside. The combustion furnace 11 sucks the outside air from the inlet, and heats the sucked air to generate hot air. The combustion furnace 11 combusts a gas to heat the air, for example. Further, the combustion furnace 11 is provided with a hot air fan (not shown) to which a hot air piping 22 is attached. The hot air piping 22 connects the hot air fan and the blowing box 12. The hot air fan sends the hot air generated by the combustion furnace 11 to the blowing box 12 through the hot air piping 22.

Incidentally, the temperature of the hot air sent from the combustion furnace 11 to the blowing box 12 is set 200° C. or higher, and the humidity of the same is set to 20% or lower, for example.

The blowing box 12 (which is an example of a blower) is formed into the shape of a hollow container, and has a face on the lower side in the third direction Z opened. As shown in FIG. 2, a jetting guide member 23 is detachably attached to a lower end of the blowing box 12 in the third direction Z. The jetting guide member 23 is provided with a plurality of jetting ports 23a each extending in the second direction Y. The plurality of jetting ports 23a are arranged at a predetermined interval in the first direction X. Further, as shown in FIG. 1, the plurality of jetting ports 23a eject the hot air sent from the combustion furnace 11 through the hot air piping 22 downward in the third direction Z.

The length of the opening of each jetting port 23a in the second direction Y is set to be substantially equal to or slightly smaller than the length of the food placed on a belt member 41 (which is to be described later) of the conveying unit 3 in the second direction Y.

Alternatively, it is also possible to prepare a plurality of types of jetting guide members 23 each different in length of the opening of the jetting ports 23a in the second direction Y, in number of the jetting ports 23a, and/or in shape of a part from a mounting portion for being mounted to the blowing box 12 to the jetting ports 23a (i.e., shape of nozzle throttle). Thus, the amount of the hot air ejected from the blowing box 12 can be adjusted according to the food by changing the jetting guide member 23.

In the present example, a configuration in which the jetting guide member 23 is shaped so that the opening of each jetting port 23a thereof extends in the second direction Y is discussed, however the present invention is not limited to such a configuration. For example, the present invention also includes a configuration in which a plurality of jetting ports are arranged at a predetermined interval in the second direction Y, and the opening of each jetting port extends in the first direction X. Further, the present invention also includes a configuration in which a plurality of jetting ports are scattered in a plane defined by the first direction X and the second direction Y either at a predetermined interval in the first direction X and the second direction Y or in a houndstooth-like pattern.

Incidentally, in the present example, a configuration in which the jetting guide member 23 and the blowing box 12 are formed as separated components is discussed; however, the present invention is not limited to such a configuration, but also includes a configuration in which the jetting guide member 23 and the blowing box 12 are integrated with each other.

Further, in the present example, a configuration in which the jetting guide member 23 is attached to the blowing box 12 is described, however, the present invention is not limited to such a configuration. For example, an end portion of the hot air piping 22 on the ejection side may be extended to a position above the belt member 41 of the conveying unit 3 in the third direction Z, and the jetting guide member 23 is directly attached to the end portion of the hot air piping 22. In other words, the blower is formed by the jetting guide member 23 and the end portion of the hot air piping 22.

The blowing box 12 is covered by the cover member 13. The cover member 13 is formed into the shape of a hollow container, and has a face on the lower side in the third direction Z and a face on the other side in the second direction Y opened. As shown in FIG. 3 and FIG. 4, the opening of the cover member 13 on the other side in the second direction Y is closed by an opening/closing lid 24 in an openable manner, so that maintenance for the blowing box 12 arranged within the cover member 13 and attaching/detaching work of the jetting guide member 23 can be performed by opening the opening/closing lid 24.

The cover member 13 covers a suction box 61 of the suction unit 4 and a suction port 65a of a suction guide member 65 (all these components are to be described later) from above in the third direction Z. The inner space of the cover member 13 is filled with the hot air ejected from the blowing box 12 but not sucked by the suction unit 4 (which is to be described later).

The circulator 15 is arranged in an upper portion of the cover member 13 in third direction, wherein the circulator 15 is formed by a fan or the like, for example. A piping for circulation 25 is connected to the circulator 15. The piping for circulation 25 connects the circulator 15 and the combustion furnace 11. When the circulator 15 is driven, the hot air filled in the inner space of the cover member 13 is sent to the combustion furnace 11 through the piping for circulation 25, and thereby the combustion efficiency of the combustion furnace 11 can be increased.

Incidentally, in the present example, a configuration in which the circulator 15 is arranged in the upper portion of the cover member 13 is described; however, the present invention is not limited to such a configuration, but includes a configuration in which the circulator 15 is arranged in a lateral portion of the cover member 13.

Alternatively, it is also possible to arrange an air cleaning portion in a place between the circulator 15 and the combustion furnace 11, wherein the air cleaning portion may be formed by a filter, water, bubble or the like. The air cleaning portion is adapted to remove contaminant (such as oil, seasoning liquid and/or the like) contained in the hot air so as to clean the hot air. Thus, when sending the hot air filled in the cover member 13 to the combustion furnace 11 through the circulator 15, the contaminant (such as oil, seasoning liquid and/or the like) can be prevented from being brought into the combustion furnace 11 along with the hot air. As a result, the combustion furnace 11 can be prevented from being contaminated by the contaminant contained in the hot air, so that the combustion efficiency of the combustion furnace 11 can be prevented from being deteriorated caused by the contaminant contained in the hot air.

Further, as shown in FIG. 2 and FIG. 3, a seasoning liquid feeder 26 is arranged on one side of the cover member 13 in the first direction X. The seasoning liquid feeder 26 feeds a seasoning liquid (such as soy sauce and/or the like) to the food conveyed by the belt member 41 of the conveying unit 3.

The supporting stand for heating 17 has two barrier walls 27A, 27B, a mounting portion 28, and a leg portion for heating 29, wherein the two barrier walls 27A, 27B are interposed between the combustion furnace 11 and the cover member 13. As shown in FIG. 3, the first barrier wall 27A is arranged on one side of the combustion furnace 11 and the cover member 13 in the first direction X, and the second barrier wall 27B is arranged on the other side of the combustion furnace 11 and the cover member 13 in the first direction X.

As shown in FIG. 4, the combustion furnace 11 is mounted on the mounting portion 28. The leg portion for heating 29 projects downward in the third direction Z from an end portion of the mounting portion 28 on the lower side in the third direction Z. The leg portion for heating 29 has, under the combustion furnace 11 and cover member 13 in the third direction Z, an extension portion 29a that extends in the second direction Y. The extension portion 29a is provided with a plurality of leg members 29b which contact the floor to support the supporting stand for heating 17. The leg member 29b can be expanded and contracted in the third direction Z to thereby adjust the height of the combustion furnace 11, the blowing box 12 and the cover member 13.

Incidentally, the present invention is not limited to the configuration in which the combustion furnace 11 is arranged on one side of the blowing box 12 and cover member 13 in the second direction Y, but also includes a configuration in which the combustion furnace 11 is arranged above or below the blowing box 12 and cover member 13 in the third direction.

[Conveying Unit]

The conveying unit 3 is described below.

As shown in FIG. 1, the conveying unit 3 includes an endless belt member 41, a driving roller 42 (which is an example of a rotating body), a conveyance driving portion 43, and four detour rollers 45a, 45b, 45c, 45d. The conveying unit 3 further includes a conveyance supporting stand 50 that rotatably supports the driving roller 42, the driven roller 44, and the four detour rollers 45a, 45b, 45c, 45d.

The conveyance supporting stand 50 has a pair of supporting frames 51, and a conveyance supporting frame 52 that supports the pair of supporting frames 51. As shown in FIG. 3, the pair of supporting frames 51 are arranged with a predetermined space therebetween in the second direction Y. The belt member 41 is arranged between the pair of supporting frames 51.

Further, the driven roller 44 is rotatably supported by one end of the supporting frame 51 in the first direction X, and the driving roller 42 is rotatably supported by the other end of the supporting frame 51 in the first direction X. The conveyance driving portion 43 is connected to the driving roller 42. The driving roller 42 is driven to rotate by the conveyance driving portion 43.

Further, as shown in FIG. 2, the conveyance supporting frame 52 is arranged in an intermediate portion of the supporting frame 51 in the first direction X. The conveyance supporting frame 52 is provided with wheels 54 for moving the conveying unit 3. Further, the conveyance supporting frame 52 is provided with four bearing portions 52a, 52b, 52c, 52d.

The first bearing portion 52a is arranged at a position on one side of the conveyance supporting frame 52 in the first direction X, and in an upper portion of the conveyance supporting frame 52 in the third direction Z. The second bearing portion 52b is arranged at a position on the one side of the conveyance supporting frame 52 in the first direction X, and below the first bearing portion 52a in the third direction Z. The third bearing portion 52c is arranged at a position on the other side of the conveyance supporting frame 52 in the first direction X, and in the upper portion of the conveyance supporting frame 52 in the third direction Z. The fourth bearing portion 52d is arranged at a position on the other side of the conveyance supporting frame 52 in the first direction X, and below the third bearing portion 52c in the third direction Z.

The first detour roller 45a is rotatably supported by the first bearing portion 52a, the second detour roller 45b is rotatably supported by the second bearing portion 52b, the third detour roller 45c is rotatably supported by the third bearing portion 52c, and the fourth detour roller 45d is rotatably supported by the fourth bearing portion 52d.

The belt member 41 is configured by connecting a plurality of bar-like members in parallel so that the plurality of bar-like members are parallel to each other in an axial direction thereof. There is an interval enabling the hot air ejected from the blowing box 12 to pass therethrough between adjacent ones of the plurality of bar-like members of the belt member 41. The interval between adjacent ones of the plurality of bar-like members of the belt member 41 is set to be smaller than the diameter of the food (which is cooked rice in the present example) to be conveyed.

Incidentally, in the present example, a configuration in which the belt member 41 is formed by a plurality of bar-like members is described; however, the present invention is not limited to such a configuration, but includes a configuration in which the belt member 41 is formed by other types of member, such as a mesh-like member, a belt-like member having a plurality of holes formed therein or the like. In other words, other members can be used as the belt member 41, as long as such member has holes enabling the hot air ejected from the blowing box 12 to pass therethrough.

The belt member 41 is rotatably wrapped around the driving roller 42, the driven roller 44, the first detour roller 45a, the second detour roller 45b, the third detour roller 45c, and fourth detour roller 45d. The driving roller 42, the driven roller 44, and the four detour rollers 45a, 45b, 45c, 45d rotate, so that the belt member 41 rotates to circulate and move.

As shown in FIG. 2, the first detour roller 45a and the third detour roller 45c are arranged outside the belt member 41, and the second detour roller 45b and the fourth detour roller 45d are arranged inside the belt member 41.

The food is placed on an outgoing side 41A of the belt member 41, wherein the outgoing side 41A is a portion of the belt member 41 ranging from the driven roller 44 to the driving roller 42. The outgoing side 41A passes through a heating spot 100 which is a space between the blowing box 12 of the heating unit 2 and a suction box 61 (which is to be described later) of the suction unit 4.

A return side 41B of the belt member 41 faces the outgoing side 41A along the third direction Z, wherein the return side 41B is a portion of the belt member 41 ranging from the driving roller 42 to the driven roller 44 through the third detour roller 45c, fourth detour roller 45d, second detour roller 45*b*, and first detour roller 45*a*. The return side 41B of the belt member 41 is arranged so as to avoid the heating spot 100. Thus, the return side 41B (where food heating is not performed) of the belt member 41 is exposed to outside air so as not to be heated by the hot air of the heating spot 100. Further, the return side 41B is formed with a detour area 41C which is formed to swell downward in the third direction Z by the four detour rollers 45*a*, 45*b*, 45*c*, 45*d*.

Further, in the conveying unit 3 of the present example, a configuration in which the driving roller 42, the driven roller 44 and four detour rollers 45*a*, 45*b*, 45*c*, 45*d* are used as the rotating body for movably supporting the belt member 41 is described; however, the present invention is not limited to such a configuration. For example, as a configuration for driving the belt member 41 to rotate, the present invention also includes a configuration in which the driving roller 42 is provided with a sprocket, and the driving force of the conveyance driving portion 43 is transmitted to the sprocket through a chain, and a configuration in which the driving force of the conveyance driving portion 43 is transmitted to the belt member 41 by a plurality of gears. Further, a substantially disc-like pulley, for example, may be used as the rotating body.

Further, a leveling member (not shown) and a food feeding hopper (not shown), which functions as a socket for receiving fed food, are provided on one side of the conveying unit 3 in the first direction X. The leveling member and the food feeding hopper are arranged above the outgoing side 41A of the belt member 41 in the third direction Z.

The leveling member is a member adapted to thinly and substantially uniformly spread the food fed from the food feeding hopper on the belt member 41. Another type of leveling member (such as a leveling blade formed by a plurality of blade members, a component in which a helical leveling blade is driven to rotate, or the like) may also be used as the leveling member. Further, a mechanism for vibrating the food feeding hopper can be provided as a food leveling mechanism, or a conveyor that reciprocates at a predetermined stroke substantially horizontally in a direction perpendicular to the conveyance direction may be arranged between the food feeding hopper and the conveying unit 3. Further, other methods than described above may also be used.

[Suction Unit]

Next, the suction unit 4 will be described below with reference to FIG. 1 to FIG. 5B.

As shown in FIG. 1 and FIG. 2, the suction unit 4 is a unit to suck the hot air blown out from the heating unit 2. The suction unit 4 includes a suction box 61, a suction piping 62, and a suction guide member 65.

The suction box 61 is formed into the shape of a hollow container, and has a face on the upper side in the third direction Z opened. The suction box 61 is attached to the conveyance supporting stand 50 through the fixing portion 67. The suction box 61 is arranged within the detour area 41C formed on the return side 41B of the belt member 41, and faces the blowing box 12 of the heating unit 2 through the outgoing side 41A of the belt member 41. The space between the blowing box 12 of the heating unit 2 and the suction box 61 of the suction unit 4 is the heating spot 100 where the food is heated. The suction guide member 65 is detachably attached to an opening of the suction box 61.

Figure 5A:
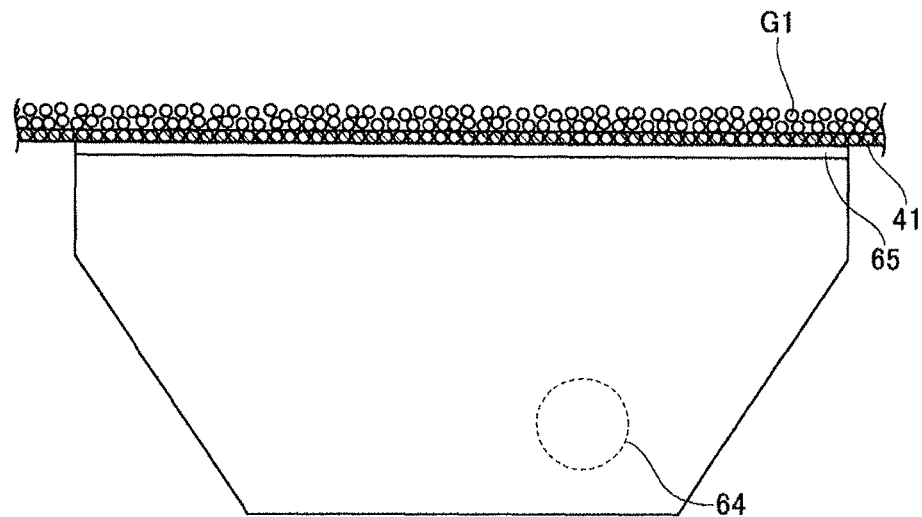
Figure 5B:
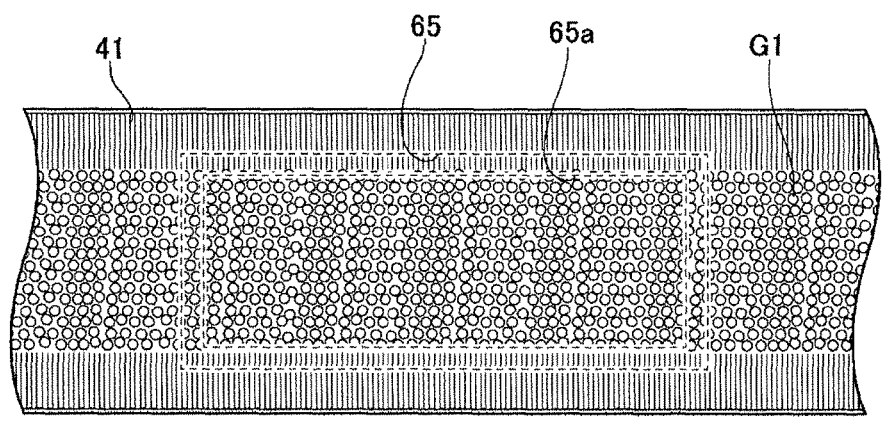

FIG. 5A and FIG. 5B are views showing a positional relationship of the suction box 61 and the suction guide member 65 with respect to the food.

As shown in FIG. 5A, the suction guide member 65 is interposed between the suction box 61 and the outgoing side 41A of the belt member 41. The suction guide member 65 tightly connects the suction box 61 and the belt member 41, and thereby the hot air passing through the belt member 41 can be prevented from being leaked out around the suction box 61.

As shown in FIG. 1 and FIG. 5B, the suction guide member 65 is provided with a suction port 65*a*. As shown in FIG. 5B, the length of the opening of the suction port 65*a* of the suction guide member 65 in the second direction Y is set to be substantially equal to or slightly smaller than the length of the food G1 placed on the belt member 4 in the second direction Y.

Alternatively, it is also possible to prepare a plurality of types of suction guide member 65 each different in length of the opening of the suction port 65*a* in the second direction Y, and/or in shape of the opening of the suction port 65*a*. Thus, suction amount and suction area of the suction box 61 can be adjusted according to the food by changing the suction guide member 65.

Incidentally, in the present example, a configuration in which the suction guide member 65 and the suction box 61 are formed as separated components is discussed; however, the present invention is not limited to such a configuration, but also includes a configuration in which the suction guide member 65 and the suction box 61 are integrated with each other.

Further, the suction box 61 is provided with a connection piping 64. The connection piping 64 is detachably connected to a connector 62*a* of the suction piping 62. The suction piping 62 is connected to an exhaust fan (not shown). When the exhaust fan is driven, the air above the suction box 61 in the third direction Z is sucked in through the suction piping 62 and the connection piping 64.

Figure 6:
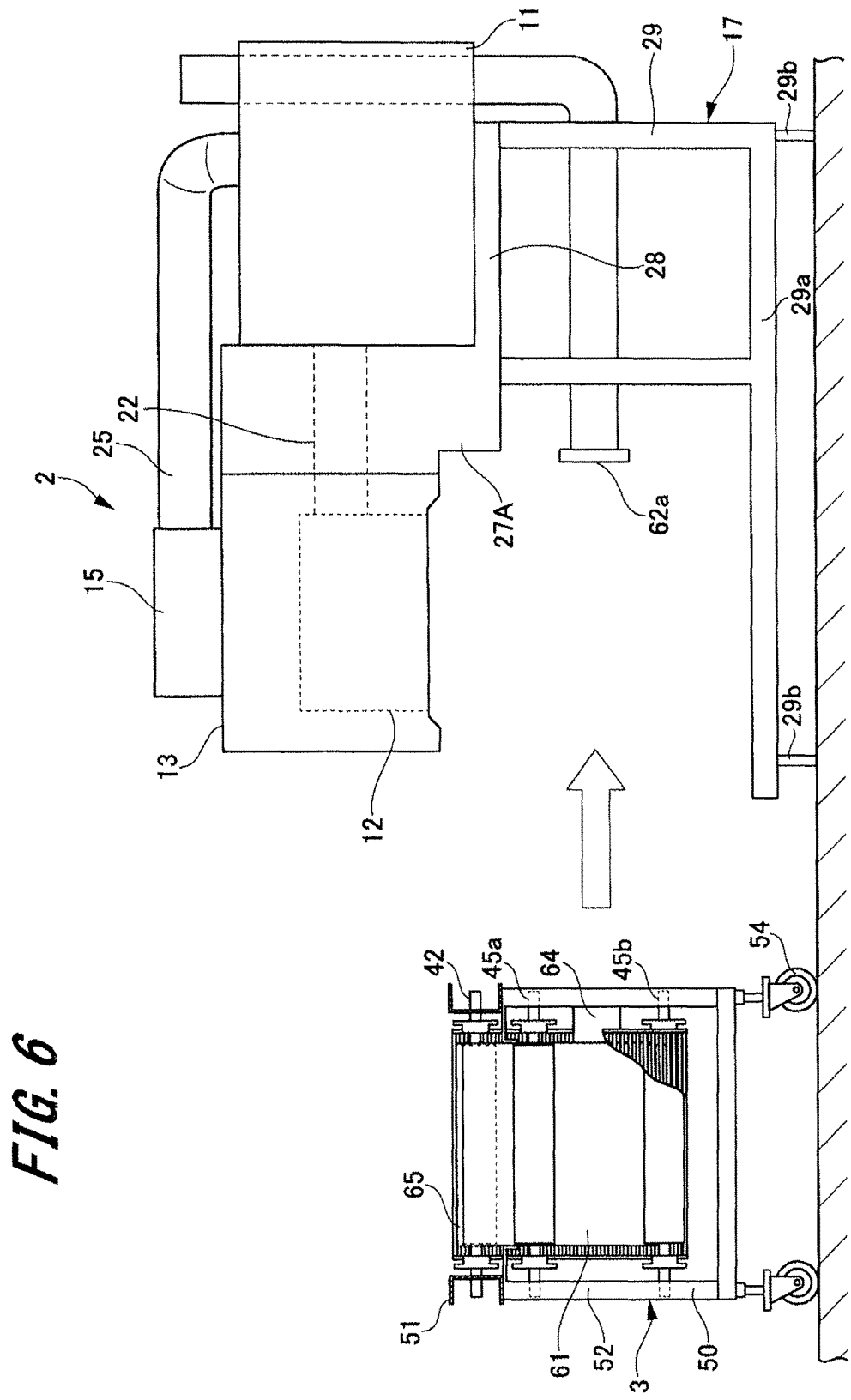
FIG. 6 is a front view showing a conveying unit, the suction box and a heating unit of the food heating device according to the embodiment of the present invention, in a state where the conveying unit and the suction box are separated from the heating unit.

FIG. 6 is a front view showing the conveying unit 3, the suction box 61 and the heating unit 2 in a state where the conveying unit 3 and the suction box 61 are separated from the heating unit 2.

Here, in a conventional food heating device, the entire conveying unit for conveying the food is surrounded by a cabinet, and the conveying unit and the heating unit are integrated with each other; therefore, in order to clean or maintain the conveying unit, it is necessary to once dismantle the cabinet, the heating unit and the conveying unit, which is a burdensome work.

In contrast, in the food heating device 1 of the present example, the connection piping 64 connected to the suction box 61 is detachably coupled to the suction piping 62. Further, the heating unit 2 simply faces the outgoing side 41A of the conveying unit 3, and the heating unit 2 and the conveying unit 3 are not connected to each other. Further, in the food heating device 1 of the present example, the conveyance supporting stand 50 of the conveying unit 3 is provided with the wheels 54.

Thus, as shown in FIG. 6, in the food heating device 1 of the present example, the conveying unit 3 (which has the belt member 41) and the heating unit 2 can be separated from each other. In such a manner, when performing maintenance, the belt member 41 can be separated from below the blowing box 12 of the heating unit 2 in the third direction Z. Thus, the space above the outgoing side 41A of the belt member 41 in the third direction Z becomes open, so that the belt member 41 can be efficiently cleaned.

Further, in the present example, a configuration in which the conveyance supporting stand 50 of the conveying unit 3 is provided with the wheels 54 so that the conveying unit 3 becomes movable is described; however, the present invention is not limited to such a configuration. For example, the present invention also includes a configuration in which the supporting stand for heating 17 for supporting the combustion furnace 11 and the blowing box 12 is provided with wheels so that the heating unit 2 becomes movable.

Further, in the present example, a configuration in which the suction box 61 is fixed to the conveyance supporting stand 50 of the conveying unit 3 is described; however, the present invention is not limited to such a configuration. For example, the present invention also includes a configuration in which the suction box 61 is detachably attached to the conveyance supporting stand 50, so that when separating the conveying unit 3 from the heating unit 2, the suction box 61 is separated from the conveying unit 3. With such a configuration, not only the space above the outgoing side 41A of the belt member 41, but also the space below the outgoing side 41A of the belt member 41 in the third direction Z can be opened, so that the belt member 41 can be more efficiently cleaned.

Further, in the food heating device 1 of the present example, the return side 41A of the belt member 41 detours to avoid the space between the suction box 61 and the heating unit 2. Thus, in the food heating device 1 of the present example, it is possible to provide a cleaning unit on the return side 41A of the belt member 41 to remove the food, the seasoning liquid and the like stuck to the belt member 41. Examples of the cleaning unit include a configuration in which the food stuck to the belt member 41 is blown off by blowing air to the belt member 41, a configuration in which the belt member 41 is caused to pass through a tank in which a liquid cleaner such as water is stored, and the like.

Thus, it is possible to heat the food while cleaning the seasoning liquid, the food and the like stuck to the belt member 41 without temporarily stopping the conveying unit 3 of the food heating device 1. As a result, production capacity of the food heating device 1 can be increased.

2. Method of Heating Food

Next, a method of heating a food using the food heating device 1 having the aforesaid configuration will be described below with reference to FIG. 1 to FIG. 8.

Figure 7:
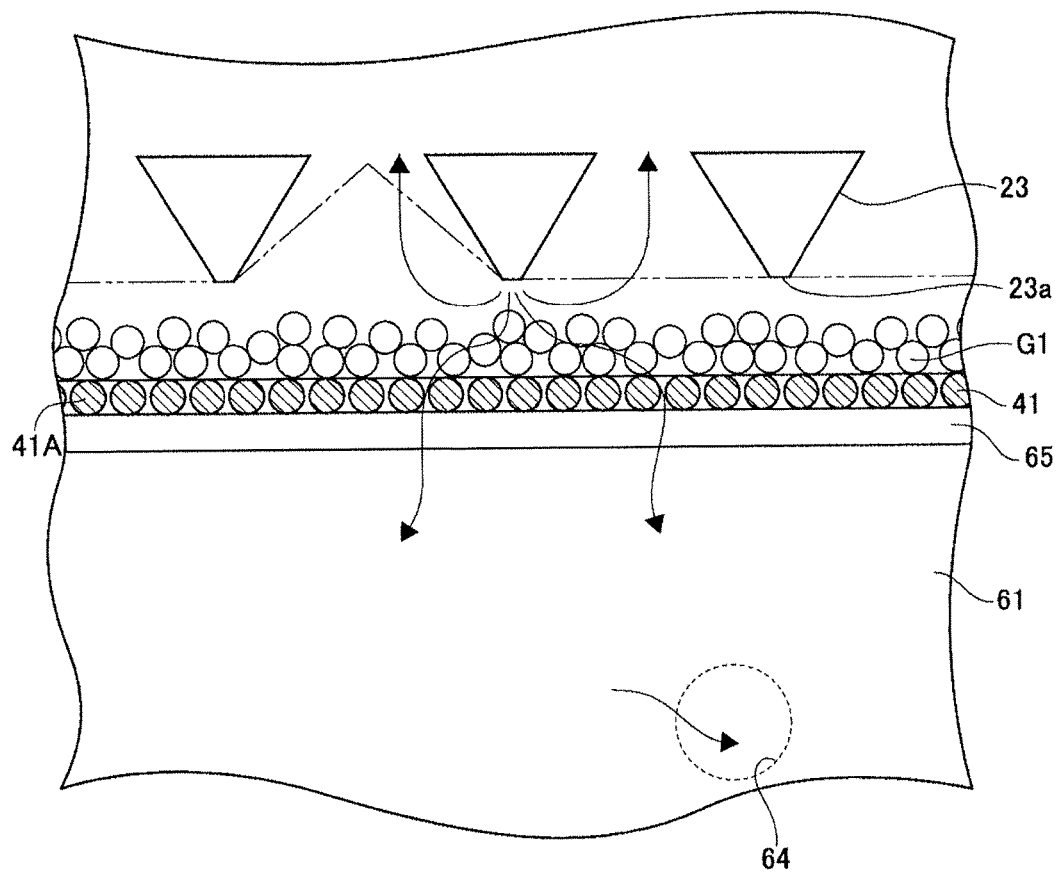
FIG. 7 is a view explaining a state where hot air is passing through the food placed in the food heating device according to the embodiment of the present invention.
Figure 8:
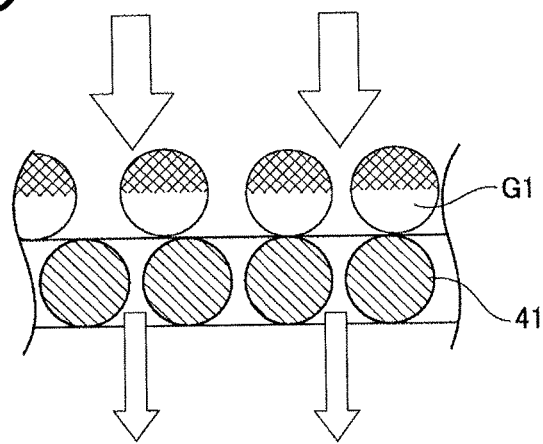
FIG. 8 is a view explaining a state where the food is being heated by the food heating device according to the embodiment of the present invention.

FIG. 7 is a view explaining a state where the hot air is passing through the food G1 placed in the food heating device 1 of the present example; and FIG. 8 is a view explaining a state where the food G1 is being heated by the food heating device 1 of the present example.

First, as shown in FIG. 1, the combustion furnace 11 of the heating unit 2 sucks the outside air from the inlet, and heats the sucked air. Next, the air heated by the combustion furnace 11 is sent to the blowing box 12 through the hot air piping 22. Thus, the space inside the blowing box 12 is heated, and the space inside the cover member 13, which covers the blowing box 12, is also heated. For example, when the combustion furnace 11 is set to 300° C., the temperature inside the blowing box 12 will become 220° C.

Further, the food is fed from the food feeding hopper to one side of the outgoing side 41A of the belt member 41 in the first direction X. Next, the belt member 41 is rotated, and the fed food is leveled by the leveling member (not shown) so that the food is spread on the belt member 41 at a substantially uniform thickness. Next, the seasoning liquid is sprayed from the seasoning liquid feeder 26 onto the food G1 spread on the belt member 41.

Further, the food G1 on which the seasoning liquid has been sprayed is conveyed by the belt member 41 to the heating spot 100 where the blowing box 12 and the suction box 61 face each other. Next, as shown in FIG. 6, the hot air sent to the blowing box 12 is ejected from the jetting ports 23a of the jetting guide member 23.

At this time, by driving the exhaust fan (not shown), the space inside the suction box 61, which faces the blowing box 12, has a negative pressure. Thus, as shown in FIG. 7, the hot air ejected from the jetting ports 23a passes the outgoing side 41A of the belt member 41 and the food G1 to be sucked by the suction box 61 through the suction port 65a of the suction guide member 65. Further, the hot air sucked by the suction box 61 is exhausted to the outside of the device through the connection piping 64 and the suction piping 62.

When the hot air is passing through the interstices between the food G1, surplus water adhering to the surface of the food G1 will evaporate due to the hot air passed therethrough. Thus, it is possible to dry the surface of the food G1. Further, the direction in which the hot air is blown is set to only one direction, which is a direction from upper side toward lower side, and thereby the upper face of the food G1 is heated as shown in FIG. 8. As a result, with respect to the seasoning liquid stuck to the food G1, it is possible to only burn the seasoning liquid stuck to the upper face part of the food G1, or only burn the upper face part of the food G1, without burn the rest part of the food G1.

Alternatively, in the present example, the air amount sucked from the suction port 65a may also be set to be smaller than the hot air amount ejected from the jetting ports 23a according to the degree to which the food G1 is to be dried. At this time, as shown in FIG. 1, a part of the hot air ejected from the jetting ports 23a remains without being sucked by the suction unit 4. Incidentally, in the present example, the blowing box 12 is covered by the cover member 13. Thus, the inner space of the cover member 13 is filled with the hot air not sucked by the suction unit 4, and therefore has a positive pressure. Further, in the present example, the hot air accumulated in the inner space of the cover member 13 is sent to the combustion furnace 11 through the piping for circulation 25, and thereby the combustion efficiency of the combustion furnace 11 can be increased.

Here, the hot air passing through the interstices between the food G1 and sucked by the suction unit 4 has surplus water of the food G1 mixed therein, and therefore has higher humidity than the hot air sent from the combustion furnace 11. In contrast, the surplus hot air accumulated in the inner space of the cover member 13 does not pass through the food G1 and the belt member 41, and therefore humidity is less changed, so that increase in humidity is inhibited. Thus, even if the hot air is returned to the combustion furnace 11 by the circulator 15, increase in humidity of the hot air supplied to the blowing box 12 can be inhibited.

The hot air ejected from the blowing box 12 can be inhibited from being leaked out around the heating spot 100 by sucking the hot air ejected from the blowing box 12 with the suction unit 4 and covering the blowing box 12 with the cover member 13. Thus, in the present example, it is possible to keep only the heating spot 100 in high-temperature environment and prevent surrounding temperature from rising.

Further, as shown in FIG. 2, the return side 41B of the belt member 41 is arranged so as to avoid the heating spot 100, and therefore the return side 41B of the belt member 41 is free from being blown by the hot air. With such an arrangement, the temperature of the belt member 41 can be prevented from rising more than necessary due to being exposed to high-temperature environment for long time, and therefore the food G1 stuck to the belt member 41 can be prevented from being burned.

Further, the return side 41B is formed with the detour area 41C by the four detour rollers 45a, 45b, 45c, 45d to detour not only the heating spot 100 but also the space surrounding the suction box 61. With such an arrangement, the length of the return side 41B can be set to be greater than the length of the outgoing side 41A of the belt member 41. In other words, the duration in which the belt member 41 is exposed to the outside air without being heated can be set to be longer than the duration in which the belt member 41 is heated, so that the rise in temperature of the belt member 41 can be efficiently inhibited.

Further, the length of the opening of both the jetting port 23a and the suction port 65a in the second direction Y is set to be substantially equal to or slightly smaller than the length of the food G1 fed to the belt member 41 in the second direction Y, and thereby the hot air can be prevented from being sucked from an area of the belt member 41 where the food G1 is not placed. Thus, in the hot air ejected from the jetting ports 23a, the hot air sucked by the suction box 61 can be all used to dry the surface of the food G1. As a result, the surface of the food G1 can be dried in short time, and the inside of the food G1 can be prevented from being dried due to being excessively heated.

Further, since the hot air is prevented from being blown to an area unnecessary to be heated of the belt member 41, the belt member 41 can be prevented from being excessively heated. Thus, the belt member 41 can be prevented from being damaged by high temperature, and the food G1 can be prevented from being unintentionally burned by the heated belt member 41.

Further, in the present example, the device is provided with the leveling member adapted to thinly and substantially uniformly spread the food G1 on the belt member 41 before the food G1 passes through the heating spot 100. Thus, even if the device is used to heat other foods than the cooked rice (such as a string-like food, a powdery food, a granular food and the like), it is possible to bring the hot air to each piece of the food, so that uneven heating can be inhibited.

Next, the food G1 passes through the heating spot 100 and thereby the heating of the food G1 by the heating spot 100 is finished, then the food G1 is conveyed by the conveying unit 3 to a delivery position on the other end in the first direction X, and thereby the heating operation of the food with the food heating device 1 of the present example is completed.

An embodiment of the food heating device, including its advantageous effects, is described as above. However, the food heating device of the present invention is not limited to the embodiment described above, and various modifications and variations can be made without departing from the spirit and scope of the present invention.

In the aforesaid embodiment, an example in which the device is used to heat cooked rice (as an example of the food to be heated) is described; however, the food to be heated is not limited to the cooked rice. Examples of the food possible to be heated by the food heating device of the present invention also include other kinds of food such as vegetable, rice ball, seafood, meat, pizza and the like.

REFERENCE SIGNS LIST

1 food heating device
2 heating unit
3 conveying unit
4 suction unit
11 combustion furnace (heating portion)
12 blowing box (blower)
13 cover member
15 circulator
17 supporting stand for heating
22 hot air piping
23 jetting guide member (blower)
23a jetting port
24 opening/closing lid
25 piping for circulation
41 belt member
41A outgoing side
41B return side
41C detour area
42 driving roller (rotating body)
43 conveyance driving portion (rotating body)
45a, 45b, 45c, 45d detour roller (detour rotating body)
50 conveyance supporting stand
61 suction box
62 suction piping
62a connector
64 connection piping
65 suction guide member
65a suction port
100 heating spot
G1 food

The invention claimed is:
1. A food heating device comprising:
a conveying unit that conveys a food;
a heating unit that blows hot air to the food conveyed by the conveying unit; and
a suction unit that is disposed to face the heating unit and that can suck the hot air passing through the conveying unit and the food,
wherein the conveying unit comprises:
an endless belt member enabling the hot air to pass therethrough, and
a rotating body capable of movably supporting the belt member,
wherein the belt member has an outgoing side on which the food is placed, and a return side which is continuous with the outgoing side, wherein the outgoing side passes through a space between the heating unit and the suction unit, and the return side is disposed to face the outgoing side and avoid the space between the heating unit and the suction unit, and
wherein the belt member is inclined, at least with respect to the outgoing side thereof, at a constant angle in a direction in which the belt member moves.
2. The food heating device according to claim 1, wherein the heating unit comprises:
a heating portion that heats air to generate the hot air;
a blower that blows the hot air generated by the heating portion to the food conveyed by the conveying unit;
a cover member that covers the blower and at least a part of the outgoing side from above; and
a circulator provided to the cover member and adapted to return, in the inner space of the cover member, the hot air having not passed through the belt member and the food to the heating portion.
3. The food heating device according to claim 1, wherein the suction unit comprises:
a guide member having a suction port for sucking the hot air, wherein the size of the suction port can be changed according to the food to be conveyed to the belt member.

4. The food heating device according to claim 2, wherein the suction unit comprises:
 a guide member having a suction port for sucking the hot air, wherein the size of the suction port can be changed according to the food to be conveyed to the belt member.

5. The food heating device according to claim 1, wherein the rotating body has, in the return side of the belt member, a detour rotating body for forming a detour area that detours around the suction unit.

6. The food heating device according to claim 2, wherein the rotating body has, in the return side of the belt member, a detour rotating body for forming a detour area that detours around the suction unit.

7. The food heating device according to claim 3, wherein the rotating body has, in the return side of the belt member, a detour rotating body for forming a detour area that detours around the suction unit.

8. The food heating device according to claim 4, wherein the rotating body has, in the return side of the belt member, a detour rotating body for forming a detour area that detours around the suction unit.

9. The food heating device according to claim 1, wherein the suction unit discharges the hot air having passed through the conveying unit and the food, to the outside.

10. The food heating device according to claim 1, wherein the heating unit and the conveying unit are not connected to each other and are separable from each other.

11. The food heating device according to claim 2, wherein the suction unit discharges the hot air having passed through the conveying unit and the food, to the outside.

12. The food heating device according to claim 3, wherein the suction unit discharges the hot air having passed through the conveying unit and the food, to the outside.

13. The food heating device according to claim 4, wherein the suction unit discharges the hot air having passed through the conveying unit and the food, to the outside.

14. The food heating device according to claim 8, wherein the suction unit discharges the hot air having passed through the conveying unit and the food, to the outside.

15. The food heating device according to claim 8, wherein the heating unit and the conveying unit are not connected to each other and are separable from each other.

16. The food heating device according to claim 2, wherein the heating unit and the conveying unit are not connected to each other and are separable from each other.

17. The food heating device according to claim 3, wherein the heating unit and the conveying unit are not connected to each other and are separable from each other.

18. The food heating device according to claim 4, wherein the heating unit and the conveying unit are not connected to each other and are separable from each other.

19. The food heating device according to claim 13, wherein the heating unit and the conveying unit are not connected to each other and are separable from each other.

20. The food heating device according to claim 14, wherein the heating unit and the conveying unit are not connected to each other and are separable from each other.

\* \* \* \* \*